Jan. 23, 1968  R. K. DEGENER  3,365,073
ADJUSTABLE CLAMP FOR STORAGE RACKS
Filed Oct. 7, 1965                                                                 2 Sheets-Sheet 1

INVENTOR.
Richard K. Degener
BY
Barnard, McGlynn & Leising
ATTORNEYS

Jan. 23, 1968 R. K. DEGENER 3,365,073
ADJUSTABLE CLAMP FOR STORAGE RACKS
Filed Oct. 7, 1965 2 Sheets-Sheet 2

INVENTOR.
Richard K. Degener
BY
Barnard, McGlynn & Reising
ATTORNEYS

United States Patent Office 3,365,073
Patented Jan. 23, 1968

3,365,073
ADJUSTABLE CLAMP FOR STORAGE RACKS
Richard K. Degener, Grosse Pointe, Mich., assignor, by mesne assignments, to Storage Systems, Inc., Detroit, Mich., a corporation of Michigan
Filed Oct. 7, 1965, Ser. No. 493,638
20 Claims. (Cl. 211—176)

ABSTRACT OF THE DISCLOSURE

A flow-through storage rack of the type for supporting pallets and having at least two parallel rows of vertical posts, a plurality of beams each extending from at least one of the posts, a pair of parallel load carrying rails attached to the beams, in which bracket means connects each of the beams to at least one post for adjusting vertical height of each of the beams and the angular disposition of each of the beams about its longitudinal axis so that the rails may be slanted downward from one end of the rack to the other.

Storage racks of the instant type are utilized in warehouses and the like for supporting pallets which are loaded with goods and moved about by a fork lift truck. Normally, a fork lift truck is utilized to carry a loaded pallet to such a storage rack for deposit on the rack so that the pallet is supported thereby. Such storage racks are utilized so that it is not necessary to stack loaded pallets one on top of the other, which stacking frequently causes damage to the goods on the respective pallets due to the weight of the loaded pallets on the goods of the lower pallets. Hence, each pallet is individually supported by the storage rack and the goods on each respective pallet do not support the weight of other pallets stacked thereon.

Frequently, storage racks of the instant type are of the drive-in type wherein a fork lift truck may be driven into the rack to deposit a pallet thereon so that loaded pallets may be placed in side-by-side relationship from one end to the other of the rack. Such racks have the disadvantage of necessitating the removal of a large number of pallets in order to remove a pallet which has been stored internally or toward the middle of the rack. In addition, it is frequently desirable that loaded pallets be removed from a storage rack on a first-in-first-out basis. For example, when pallets are loaded with goods of a perishable nature, it is desirable that the pallet first placed in the storage rack be the first removed. As a solution, a flow-through storage rack has been developed wherein a pair of load carrying rails are utilized to support loaded pallets with each of the rails slanting downward from one end of the rack to the other so that loaded pallets may be placed on the rails at the high end and moved along the rails to the lower end as more pallets are placed into the storage rack. Thus, loaded pallets may be removed from the lower end of the load carrying rails so that the loaded pallets may be stored and removed from the storage rack on a first-in-first-out basis.

As alluded to previously, each pair of parallel load carrying rails are attached to a plurality of beams which beams extend between adjacent rows of posts, or extend in a cantilevered fashion from one of the posts. In order that each pair of load carrying rails slant downward from one end of the rack to the other, it is necessary that successive beams be attached to the respective posts at different vertical heights and at an angle equal to the angle at which the load carrying beams slant downward.

Accordingly, it is an object and feature of this invention to provide a bracket means connecting each of the beams to a post for adjusting the vertical height and angular disposition of each beam so that the load carrying rails slant downward from one end to the other of a flow-through storage rack.

In general, the objects and features of this invention may be attained by a storage rack constructed in accordance with the instant invention and including at least two parallel rows of vertical posts with each of the rows extending between first and second ends of the rack, and a plurality of beams each of which extends from at least one of the posts. At least one pair of parallel load carrying rails are attached to the beams and extend between the first and second ends of the rack for supporting loaded pallets thereon. A bracket means connects each of the beams to a post in at least one of the rows. The bracket means has a first pair of elongated slots therein and each beam has a second pair of elongated slots therein. A fastening means extends through each of the slots of the first pair and through the respective slots of the second pair. The first and second pairs of slots respectively are angularly disposed so that one slot of the first pair has a longitudinal axis which crosses the longitudinal axis of one of the slots of the second pair and the other slot of the first pair has a longitudinal axis which crosses the longitudinal axis of the other slot of the second pair so that the beam may be moved vertically and rotated a predetermined degree relative to the post whereby each pair of parallel load carrying rails may be disposed so as to slant downward from the first end of the rack to the second end of the rack.

Other objects and attendant advantages of the present invention will be readily appreciated as the same becomes better understood by reference to the following detailed description when considered in connection with the accompanying drawings wherein.

Figure 1:
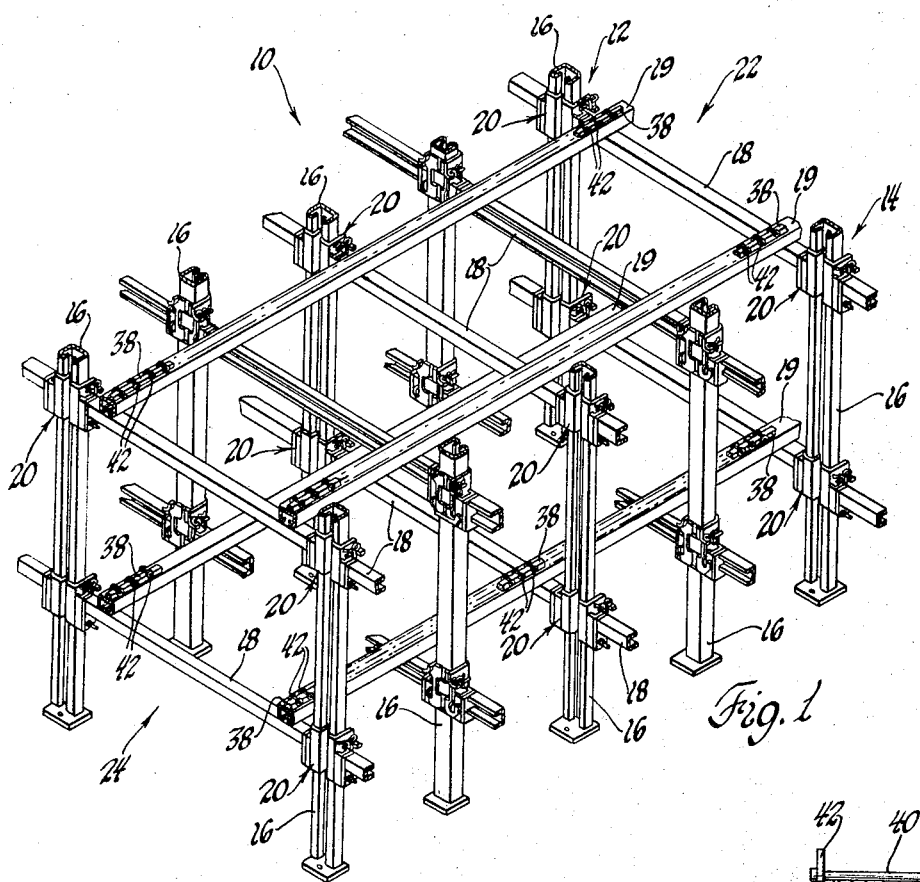
FIGURE 1 is a fragmentary perspective view of a preferred embodiment of the instant invention.

Referring now to the drawings, wherein like numerals indicate like or corresponding parts throughout the several views, there is shown generally at 10 a flow-through storage rack constructed in accordance with the instant invention. The storage rack 10 includes at least two, and preferably more, parallel rows 12 and 14 of vertical posts 16, a plurality of beams 18, load carrying rails 19, and a plurality of bracket means, each of which is shown generally at 20. As illustrated, there are two parallel rows 12 and 14 of evenly spaced vertical posts 16 with each of the rows extending between the first end of the rack, generally shown at 22, and a second end of the rack, generally shown at 24. It is to be understood, however, that the storage rack 10 may include many more than two parallel rows of posts.

Each of the posts 16 has a cross section including a first side 26, and second and third parallel sides 28 and 30 extending from the first side 26. The second and third sides 28 and 30 respectively terminate in reversely curved portions 32 and 34. The first side 26 has a plurality of apertures 36 therein at equally spaced intervals therealong.

Figure 2:
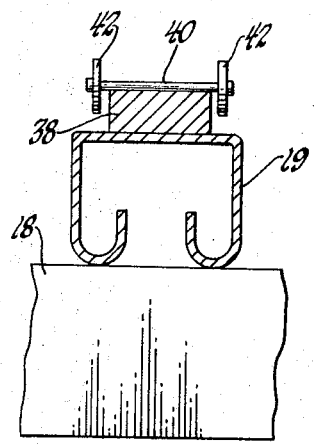
FIGURE 2 is an end view of a load carrying rail.
Figure 3:
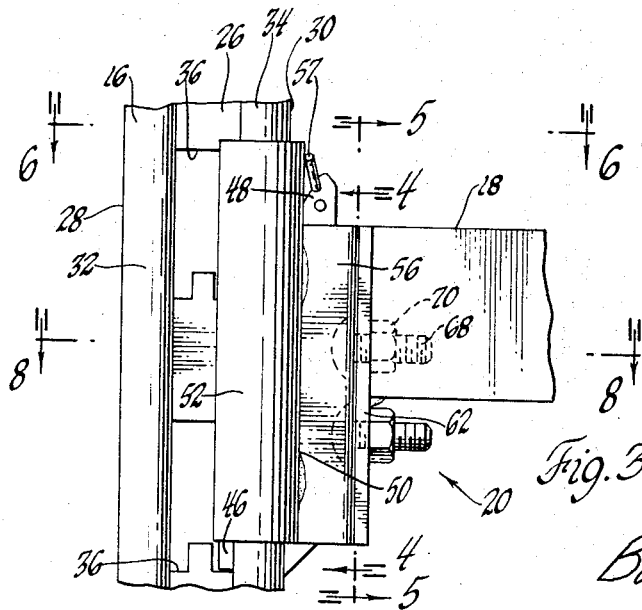
FIGURE 3 is an enlarged fragmentary view of the bracket means of the instant invention.

The beams 18 each have first and second ends and are each disposed between a post 16 in the row 12 and a post 16 in the row 14, i.e., each beam 18 is disposed between posts 16 of adjacent rows of posts. Alternatively, however, the objects of the invention may be attained by utilizing a beam extending from each of the posts 16 in a cantilevered fashion. That is to say, instead of utilizing the beams 18, each of which extends between a pair of posts 16 in adjacent rows of posts, a cantilevered beam extending laterally from each post may be utilized to support the spaced parallel load carrying rails 19. Such cantilevered beams would result if the mid-portion of each of the illustrated beams 18 were cut away. Other brace members (not shown) may be utilized with the embodiment illustrated to interconnect the posts 16. Such brace members are necessarily utilized when cantilevered beams are employed. The parallel load carrying rails 19 are grouped in pairs and are attached to the beams 18 by welding, brazing, bolts, or other fastening means, and extend between the first end 22 and the second end 24 of the rack 10 for supporting pallets thereon. As illustrated in FIGURE 1, there are two pairs of vertically spaced parallel load carrying rails 19; however, it is to be understood that the storage rack 10 may utilize any number of pairs of load carrying rails 19. An end view of one of the rails 19 is illustrated in FIGURE 2 and discloses an upwardly extending member or portion 38 on which a plurality of axles 40 are supported. Each axle 40 extends laterally in a cantilevered fashion from the upwardly extending member or portion 38 to rotatably support a roller 42 on each end thereof. A pallet, therefore, may be placed upon a pair of load carrying rails 19 to rest upon the rollers 42 so that the pallet may be easily moved from the first end 22 to the second end 24 of the rack 10. It is to be understood, however, that other appropriate means other than the rollers 42 may be utilized to facilitate easy movement of a pallet from one end of the rack 10 to the other. For example, very low frictional surfaces on top of each of the load carrying rails 19 will suffice in some instances.

A bracket means 20 connects each end of each of the beams 18 to a post 16 in one of the rows 12 or 14 for adjusting the vertical height and angular disposition of each beam 18 to slant the rails 19 downward from the first end 22 to the second end 24 of the rack 10. The bracket means 20 may be attached to a post 16 at any one of the equally spaced intervals therealong as defined by the spacing of the apertures 36. Each bracket means 20 includes a first member 44, which comprises a pair of U-shaped portions 46 each of which is disposed in one of the apertures 36, and a first pair of notched flanges 48. Each bracket means 20 also includes a second member 50, which has a portion 52 extending about one of the reversely curved portions 32 or 34 of one of the sides 28 or 30. The second member 50 also includes a second pair of notched flanges 54 which are interlocked with the first pair of notched flanges 48. A support member 56 is attached by welding, brazing, or the like, to the second member 50 and has a first pair of elongated slots 58 and 60 therein. The upper flange 54 has a lip 55 for coacting with the clip 57 to prevent the disengagement of the notched flanges 48 and 54.

Figure 4:
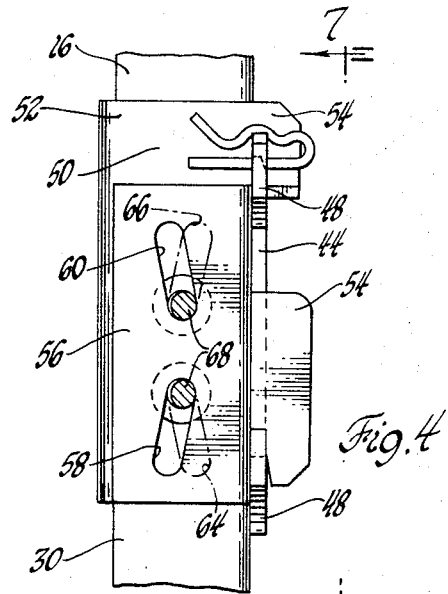
FIGURE 4 is a cross-sectional view taken substantially along line 4—4 of FIGURE 3.
Figure 5:
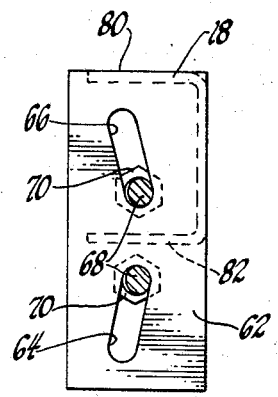
FIGURE 5 is a cross-sectional view taken substantially along line 5—5 of FIGURE 3.
Figure 6:
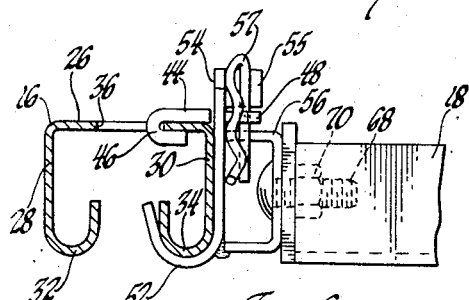
FIGURE 6 is a cross-sectional view taken substantially along line 6—6 of FIGURE 3.
Figure 7:
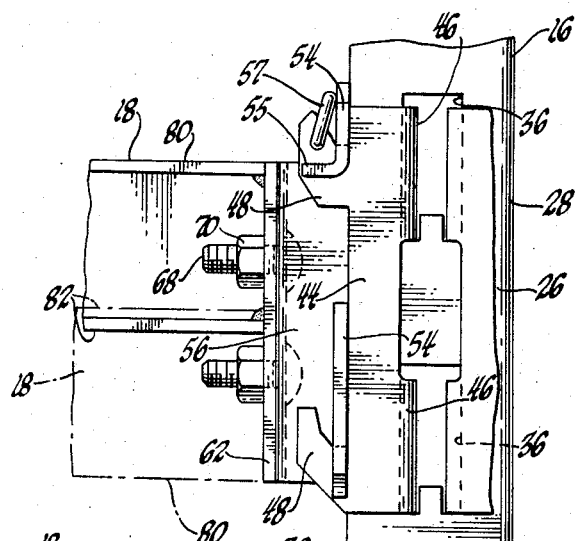
FIGURE 7 is a fragmentary view taken substantially along line 7—7 of FIGURE 4.
Figure 8:
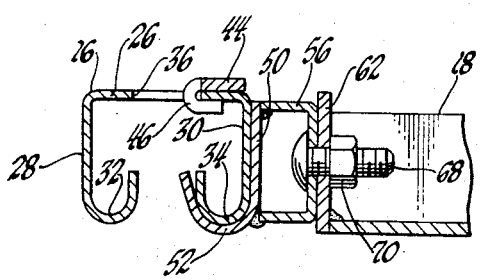
FIGURE 8 is a cross-sectional view taken substantially along line 8—8 of FIGURE 3.

Each of the beams 18 includes a plate 62 attached to each end thereof with a second pair of elongated slots 64 and 66 in each plate 62 so that each beam 18 has a pair of elongated slots 64 and 66 in each end thereof. A fastening means, comprising a bolt 68 and nut 70, extends through each of the slots 58 and 60 of the first pair of slots with each bolt 68 extending through one of the slots 64 and 66 of the second pair of slots. As is best illustrated in FIGURE 4, the first and second pairs of slots are respectively angularly disposed so that one slot 58 of the first pair has a longitudinal axis which crosses the longitudinal axis of the slot 64 of the second pair and the other slot 60 of the first pair has a longitudinal axis which crosses the longitudinal axis of the other slot 66 of the second pair so that the beam 18 may be moved vertically and rotated a predetermined degree relative to the post 16 about an axis transverse or prependicular to the longitudinal axis of the rails 19. More specifically, the longitudinal axes of the slots 58 and 60 of the first pair have an angle of less than 180° therebetween and the longitudinal axes of the slots 64 and 66 in the second pair of slots have an angle of less than 180° therebetween. The nuts 70 may be loosened so that the beam 18 may be moved relative to the support member 56, and, hence, relative to the posts 16, in a vertical direction and also angularly relative to its own longitudinal axis a predetermined degree due to the angularity of the longitudinal axes of the respective slots. As illustrated in FIGURE 4, the beam 18 may be moved vertically upward relative to the post 16 until the bottom of the slot 64 contacts the lower bolt 68 and the upper bolt contacts the upper portion of the slot 60. The beam 18 may be moved vertically downward relative to the post 16 until the upper portion of the slot 66 contacts the upper bolt 68 and the lower bolt 68 contacts the lower portion of the slot 64. As illustrated in the drawings, the length of the slots allow vertical movement of the beam 18 relative to the post 16 a distance which is equal to one half of the interval between adjacent apertures 36 in the post 16. For example, assuming that the apertures 36 are one equally spaced four-inch centers along the post 16, the length of the slots allow a total of two inches of vertical movement of the beam 18 relative to the post 16. Therefore, the slots allow the beam 18 to move relative to the post 16 a predetermined one half of the distance of the intervals between adjacent apertures 36. Without further adjustment capability, therefore, the beam 18 cannot be positioned at all vertical distances along the post 16 since the member 44 can only be attached to the beam 16 at four-inch intervals and the slots only allow two inches of vertical adjustment of the respective beams 18. However, the two inches of vertical adjustability which is not provided by the slots is provided by the unsymmetrical disposition of the slots 64 and 66 relative to the longitudinal axis of the beam 18. That is to say, as illustrated in FIGURES 5 and 7, the beam 18 presents an upper surface 80 and a lower surface 82, the longitudinal axis of the beam 18 passes between the surfaces 80 and 82, and the slot 64 is disposed outside the surface 82 so that the second pair of slots 64 and 66 are unsymmetrically disposed with respect to the longitudinal axis of the beam 18. Thus, the bolts 68 may be removed so that the orientation of the beam 18 relative to the post 16 may be changed to reverse the positions of the slots 64 and 66 for providing the adjustability in the remaining one half of the distance between the equally spaced intervals as defined by the apertures 36 whereby the beam 18 is positioned to present an upper support surface at any particular vertical distance along the post. The phantom showing of the beam 18 in FIGURE 7 illustrates the position of the surfaces 80 and 82 when the position of the slots 64 and 66 have been reversed. Thus, the beam 18 may be positioned at any particular vertical distance along the post 16 by selecting the proper apertures 36 in which to dispose the member 44 and selecting the proper orientation of the slots 64 and 66 so that the beam 18 presents a surface, either 80 or 82, at the proper vertical height and angular disposition for supporting a pair of load carrying rails 19.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downward from said first end of said rack to said second end of said rack, said bracket means having a first pair of elongated slots therein, said beam having a second pair of elongated slots, and fastening means extending through each of said slots of said first pair of slots with each fastening means extending through one of said slots of said second pair of slots.

2. A flow-through storage rack of the type for supporting pallets comprising: at least two parallel rows of spaced vertical posts with each of said rows extending between first and second ends of said rack, a plurality of beams each having first and second ends and disposed between a post in one of said rows and a post in the other of said rows, a pair of parallel load carrying rails attached to each of said beams and extending between said first and second ends of said rack for supporting pallets thereon, bracket means connecting each end of each of said beams to a post in one of said rows for adjusting the vertical height and angular disposition of each beam to slant said rails downward from said first end of said rack to said second end of said rack, said bracket means having a first pair of elongated slots therein, said beam having a second pair of elongated slots in each end thereof, and fastening means extending through each of said slots of said first pair of slots with each fastening means extending through one of said slots of said second pair of slots.

3. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downward from said first end of said rack to said second end of said rack, said bracket means having a first pair of elongated slots therein, said beam having a second pair of elongated slots, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of each of said first pair of slots has a longitudinal axis which crosses the longitudinal axis of the other slot of said second pair of slots so that each of said beams may be moved vertically and rotated a predetermined degree relative to said posts.

4. A flow-through storage rack of the type for supporting pallets comprising: at least two parallel rows of spaced vertical posts with each of said rows extending between first and second ends of said rack, a plurality of beams each having first and second ends and disposed between a post in one of said rows and a post in the other of said rows, a pair of parallel load carrying rails attached to each of said beams and extending between said first and second ends of said rack for supporting pallets thereon, bracket means connecting each end of each of said beams to a post in one of said rows for adjusting the vertical height and angular disposition of each beam to slant said rails downward from said first end of said rack to said second end of said rack, said bracket means having a first pair of elongated slots therein, said beam having a second pair of elongated slots in each end thereof, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beams may be moved vertically and rotated a predetermined degree relative to said posts.

5. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each end of each of said beams to a post in one of said rows for adjusting the vertical height and angular disposition of each beam to slant said rails downward from said first end of said rack to said second end of said rack, said bracket means having a first pair of elongated slots therein, said beam having a second pair of elongated slots therein, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree relative to said posts, said longitudinal axes of said slots in at least one of said pairs of slots having an angle of less than 180° therebetween.

6. A flow-through storage rack of the type for supporting pallets comprising: at least two parallel rows of spaced vertical posts with each of said rows extending between first and second ends of said rack, a plurality of beams each having first and second ends and disposed between a post in one of said rows and a post in the other of said rows, a pair of parallel load carrying rails attached to each of said beams and extending between said first and second ends of said rack for supporting pallets thereon, bracket means connecting each end of each of said beams to a post in one of said rows for adjusting the vertical height and angular disposition of each beam to slant said rails downward from said first end of said rack to said second end of said rack, said bracket means having a first pair of elongated slots therein, said beam having a second pair of elongated slots in each end thereof, and fastening means extending through each of said slots of said first pair of slots with each fastening means extending through one of said slots of said second pair of slots, said first and second pairs of slots respectively angularly disposed so that one slot of said first pair of slots has a longidinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree relative to said posts, said longitudinal axes of said slots in one of said pairs of slots having an angle of less than 180° therebetween.

7. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downwawrd from said first end of said rack to said second end of said rack, said bracket means having a first pair of elongated slots therein, said beam having a second pair of elongated slots, and fastening means extending through each of said slots of said first pair of slots with each fastening means extending through one of said slots of said second pair of slots, said first and second pairs of slots respectively angularly disposed so that one slot of said first pair of slot has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree, said longitudinal axes of said slots in said first pair of slots having an angle of less than 180° therebetween, said longitudinal axes of said slots in said second pair of slots having an angle of less than 180° therebetween.

8. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downward from said first end of said rack to said second end of said rack, said bracket means being attachable to a post at any one of equally spaced intervals therealong, said bracket means having a first pair of elongated slots therein, said beam having a second pair of elongated slots, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree, said slots of said first and second pair of slots being of a length sufficient to allow said beam to move vertically a distance equal to a predetermined portion of the distance of said equally spaced intervals, said second pair of slots unsymmetrically disposed with respect to the longitudinal axis of said beam so that the orientation of said beam relative to said posts may be changed to reverse the position of said second pair of slots for providing adjustability in the remaining portion of said distance of said equally spaced intervals, whereby said beam may be positioned to present an upper support surface at any particular vertical distance along said posts.

9. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downward from said first end of said rack to said second end of said rack, said bracket means being attachable to a post at any one of equally spaced intervals therealong, said bracket means having a first pair of elongated slots therein, said beam having a second pair of elongated slots therein, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree, said slots of said first and second pair of slots being of a length sufficient to allow said beam to move vertically a distance equal to one half of the distance of said equally spaced intervals, said second pair of slots unsymmetrically disposed with respect to the longitudinal axis of said beam so that the orientation of said beam relative to said posts may be changed to reverse the position of said second pair of slots for providing adjustability in the remaining one half of said distance of said equally spaced intervals, whereby said beam may be positioned to present an upper support surface at any particular vertical distance along said posts.

10. A flow-through storage rack of the type for supporting pallets comprising: at least two parallel rows of spaced vertical posts with each of said rows extending between first and second ends of said rack, a plurality of beams each having first and second ends and disposed between a post in one of said rows and a post in the other of said rows, a pair of parallel load carrying rails attached to each of said beams and extending between said first and second ends of said rack for supporting pallets thereon, bracket means connecting each end of each of said beams to a post in one of said rows for adjusting the vertical height and angular disposition of each beam to slant said rails downward from said first end of said rack to said second end of said rack, said bracket means being attachable to a post at any one of equally spaced intervals therealong, said bracket means having a first pair of elongated slots therein, said beam having a second pair of elongated slots in each end thereof, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree relative to said posts, said slots of said first and second pair of slots being of a length sufficient to allow said beam to move vertically a distance equal to one thalf of the distance of said equally spaced intervals, said second pair of slots unsymmetrically disposed with respect to the longitudinal axis of said beam so that the orientation of said beam relative to said posts may be changed to reverse the position of said second pair of slots for providing adjustability in the remaining one half of said distance of said equally spaced intervals, whereby said beam may be positioned to present an upper support surface at any particular vertical distance along said posts.

11. A flow-through storage rack of the type for supporting pallets comprising: at least two parallel rows of spaced vertical posts with each of said rows extending between first and second ends of said rack, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downward from said first end of said rack to said second end of said rack, said bracket means being attachable to a post at any one of equally spaced intervals therealong, said bracket means having a first pair of elongated slots therein, said beam having a second pair of elongated slots therein, and fastening means extending through each of said slots of said first pair of slots with each fastening means extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree relative to said posts, said longitudinal axes of said slots in at least one of said pairs of slots having an angle of less than 180° therebetween, said slots of said first and second pair of slots being of a length sufficient to allow said beam to move vertically a distance equal to a predetermined portion of the distance of said equally spaced intervals, said second pair of slots unsymmetrically disposed with respect to the longitudinal axis of said beam so that the orientation of said beam relative to said posts may be changed to reverse the position of said second pair of slots for providing adjustability in the remaining portion of said distance of said equally spaced intervals whereby said beam may be positioned to present an upper support surface at any particular vertical distance along said posts.

12. A flow-through storage rack of the type for supporting pallets comprising: at least two parallel rows of spaced vertical posts with each of said rows extending between first and second ends of said rack, each of said posts having a cross section including a first side with second and third parallel sides extending therefrom, said second and third sides each terminating in a reversely curved portion and said first side having a plurality of apertures at equally spaced intervals therealong, a plurality of beams each extending from at least one of said posts, a pair of parallel load carrying rails attached to said beams and extending between said first and second ends of said rack for supporting pallets thereon, bracket means connecting each of said beams to a post in at least one of said rows for adjusting the vertical height and angular disposition of each beam to slant said rails downward from said first end of said rack to said second end of said rack, said bracket means including, a first member having a pair of U-shaped portions each of which is disposed in one of said apertures and a first pair of notched flanges, a second member having a portion extending about one of said reversely curved portions of one of said sides and a second pair of notched flanges interlocked with said first pair of notched flanges, a support member attached to said second member and having a first pair of elongated slots therein, said beams each having a second pair of elongated slots therein, and fastening means including a bolt extending through each of said slots of said first pair of slots with each bolt extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree relative to said posts, said longitudinal axes of said slots in said first pair of slots having an angle of less htan 180° therebetween, said longitudinal axes of said slots in said sec- pair of slots having an angle of less than 180° therebetween, said slots of said first and second pair of slots being of a length sufficient to allow said beam to move vertically a distance equal to one half of the distance of said equally spaced intervals, said second pair of slots unsymmetrically disposed with respect to the longitudinal axis of said beam so that the orientation of said beam relative to said posts may be changed to reverse the position of said second pair of slots for providing adjustability in the remaining one half of said distance of said equally spaced intervals whereby said beam may be positioned to present an upper support surface at any particular vertical distance along said posts.

13. A flow-through storage rack of the type for supporting pallets comprising: at least two parallel rows of spaced vertical posts with each of said rows extending between first and second ends of said rack, each of said posts having a cross section including a first side with second and third parallel sides extending therefrom, said second and third sides each terminating in a reversely curved portion and said first side having a plurality of apertures at equally spaced intervals therealong, a plurality of beams each having first and second ends and disposed between a post in one of said rows and a post in the other of said rows, a pair of parallel load carrying rails attached to each of said beams and extending between said first and second ends of said rack for supporting pallets thereon, bracket means connecting each end of each of said beams to a post in one of said rows for adjusting the vertical height and angular disposition of each beam to slant said rails downward from said first end of said rack to said second end of said rack, said bracket means including, a first member having a pair of U-shaped portions each of which is disposed in one of said apertures and a first pair of notched flanges, a second member having a portion extending about one of said reversely curved portions of one of said sides and a second pair of notched flanges interlocked with said first pair of notched flanges, a support member attached to said second member and having a first pair of elongated slots therein, said beam having a second pair of elongated slots in each end thereof, and fastening means including a bolt extending through each of said slots of said first pair of slots with each bolt extending through one of said slots of said second pair of slots, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said beam may be moved vertically and rotated a predetermined degree relative to said posts, said longitudinal axes of said slots in said first pair of slots having an angle of less than 180° therebetween, said longitudinal axes of said slots in said second pair of slots having an angle of less than 180° therebetween, said slots of said first and second pair of slots being of a length sufficient to allow said beam to move vertically a distance equal to one half of the distance of said equally spaced intervals, said second pair of slots unsymmetrically disposed with respect to the longitudinal axis of said beam so that the orientation of said beam relative to said posts may be changed to reverse the position of said second pair of slots for providing adjustability in the remaining one half of said distance of said equally spaced intervals whereby said beam may be positioned to present an upper support surface at any particular vertical distance along said posts.

14. A bracket means for interconnecting first and second members so that the position of said first member along said second member may be selectively changed and the angular disposition of said first member relative to said second member may be changed, said bracket means comprising; a first support element adapted for attachment to said second member and having a first pair of elongated slots therein, and a second support element for attachment to said second member and having a second pair of elongated slots therein, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said first member may be moved along said second member and rotated a predetermined degree relative to said second member, and fastener means extending through the slots of said members for interconnecting the latter.

15. A bracket means for interconnecting first and second members so that the position of said first member along said second member may be selectively changed and the angular disposition of said first member relative to said second member may be changed, said bracket means comprising; a first support element adapted for attachment to said second member and having a first pair of elongated slots therein, and a second support element for attachment to said second member and having a second pair of elongated slots therein, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said first member may be moved along said second member and rotated a predetermined degree relative to said second member, said longitudinal axes of said slots in at least one of said pairs of slots having an angle of less than 180° therebetween, and fastener means extending through the slots of said members for interconnecting the latter.

16. A bracket means for interconnecting first and second members so that the position of said first member along said second member may be selectively changed and the angular disposition of said first member relative to said second member may be changed, said bracket means comprising; a first support element adapted for attachment to said second member and having a first pair of elongated slots therein, and a second support element for attachment to said second member and having a second pair of elongated slots therein, said first and second pairs of slots respectively angularly disposed so that one slot of said first pair of slots has a longitudinal axis which crosses the longitudinal axis of one of the slots of said second pair of slots and the other slot of said first pair of slots has a longitudinal axis which crosses the longitudinal axis of the other slot of said second pair of slots so that said first member may be moved along said second member and rotated a predetermined degree relative to said second member, said longitudinal axes of said slots in said first pair of slots having an angle of less than 180° therebetween, said longitudinal axes of said slots in said second pair of slots having an angle of less than 180° therebetween, and fastener means extending through the slots of said members for interconnecting the latter.

17. A storage rack of the type for supporting pallets comprising: at least two parallel rows of vertical posts with each of said rows extending between first and second ends of said rack, a plurality of beams each extending from at least one of said posts, a pair of parallel load carrying rails attached to said beams and extending between said first and second ends of said rack for supporting pallets thereon, and bracket means connecting each of said beams to a post in at least one of said rows for adjusting the vertical height of each beam to slant said rails downward from said first end of said rack to said second end of said rack, said bracket means including fastening means permitting the angular disposition of each beam to be changed about an axis which is longitudinal thereof.

18. A flow-through storage rack as set forth in claim 17 including a second pair of parallel load carrying rails vertically displaced from said first-mentioned load carrying rails and attached to a second plurality of said beams with additional bracket means connecting each of said second plurality of beams to one of said posts for adjusting the vertical height of each of said second plurality of beams to slant said second pair of rails downward from said first end of said rack to said second end of said rack, said additional bracket means including fastening means permitting the angular disposition of each of said second plurality of beams to be changed about an axis which is longitudinal thereof.

19. A storage rack of the type for supporting pallets comprising: at least two parallel rows of vertical posts with each of said rows extending between first and second ends of said rack, a plurality of beams each disposed between a post in one of said rows and a post in the other of said rows, a pair of parallel load carrying rails attached to each of said beams and extending between said first and second ends of said rack for supporting pallets thereon, and bracket means connecting each end of each of said beams to a post in one of said rows for adjusting the vertical height of each of said beams to slant said rails downwardly from said first end of said rack to said second end of said rack, said bracket means including fastening means permitting the angular disposition of each of said beams to be changed about an axis which is longitudinal thereof.

20. A flow-through storage rack as set forth in claim 19 including a second pair of parallel load carrying rails vertically displaced from said first-mentioned load carrying rails and attached to a second plurality of said beams disposed between said rows with additional bracket means connecting each end of each of said second plurality of beams to one of said posts for adjusting the vertical height of each of said second plurality of beams to slant said second pair of rails downward from said first end of said rack to said second end of said rack, said additional bracket means including fastening means permitting the angular disposition of each of said second plurality of beams to be changed about an axis which is longitudinal thereof.

References Cited
UNITED STATES PATENTS

| | | | |
|---|---|---|---|
| 2,786,578 | 3/1957 | De Graaf et al. | 211—49 |
| 2,855,167 | 10/1958 | Christopherson | 248—27 |
| 2,950,014 | 8/1960 | Sullivan | 211—151 |
| 3,009,582 | 11/1961 | Degener | 211—177 |
| 3,059,747 | 10/1962 | Sullivan | 193—35 |
| 3,144,944 | 8/1964 | McConnell | 211—148 |

JOHN PETO, *Primary Examiner.*

W. D. LOULAN, *Assistant Examiner.*